W. P. HALE.
GRAIN BINDER.

No. 251,221. Patented Dec. 20, 1881.

9 Sheets—Sheet 1.

Witnesses.
W. H. H. Knight
W. Blackstock

Inventor.
Wm. P. Hale,
By L. Hill,
His atty.

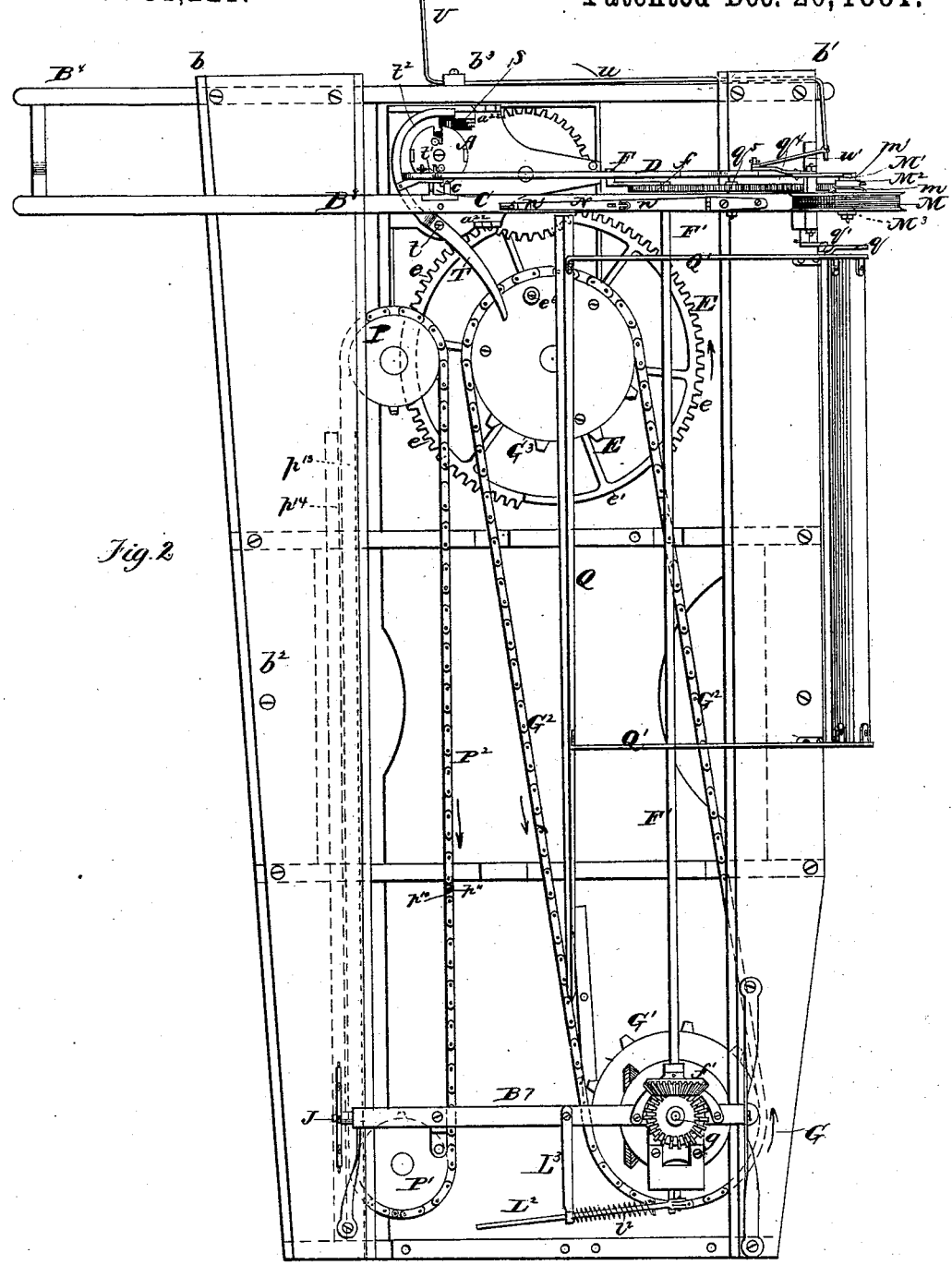

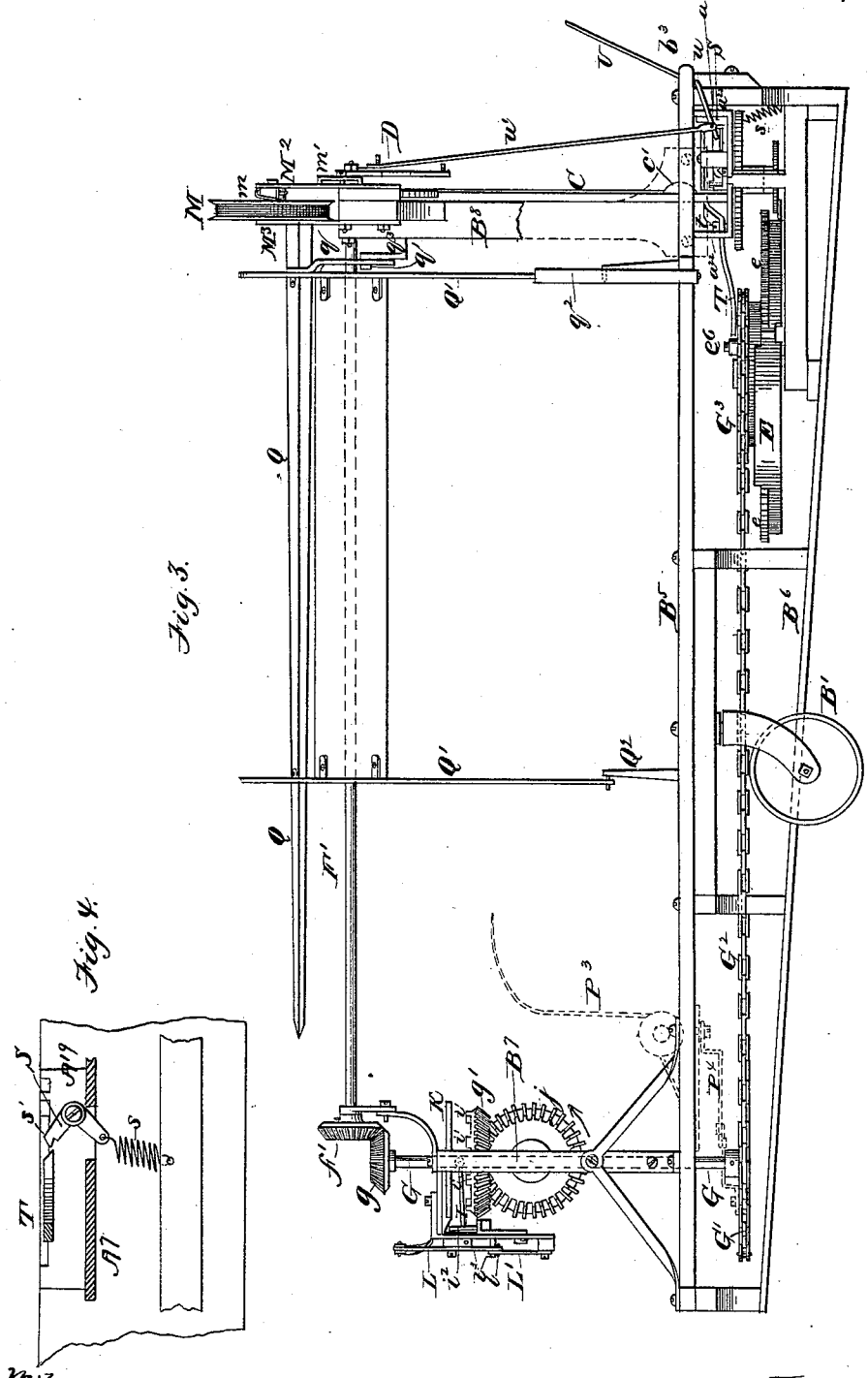

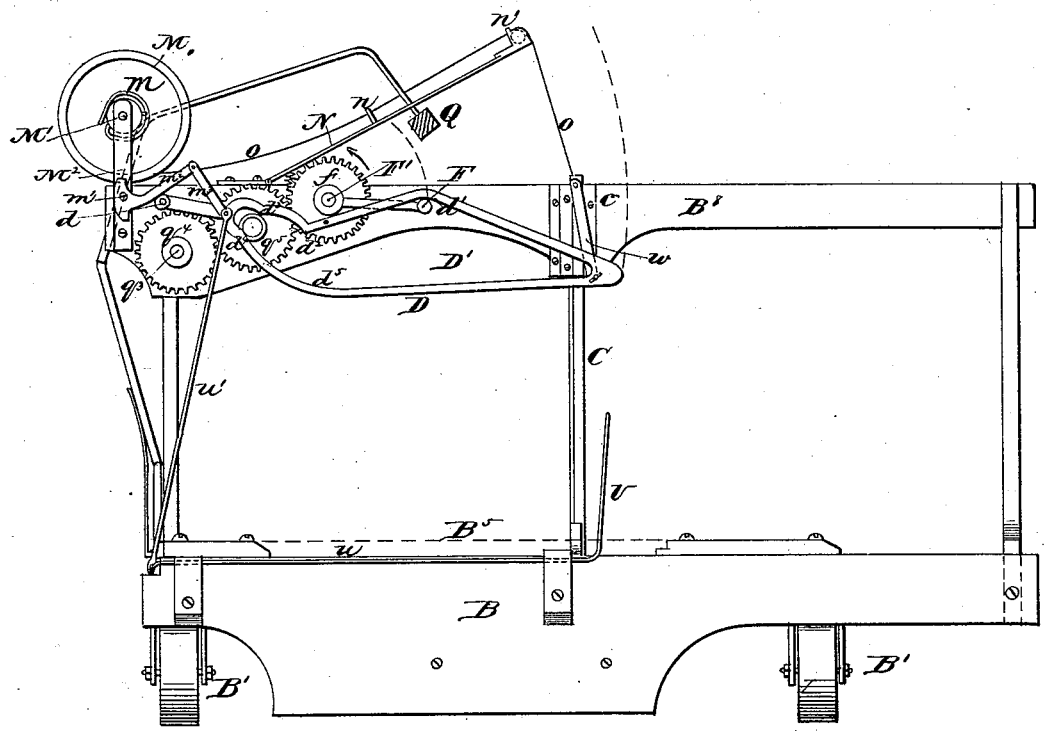
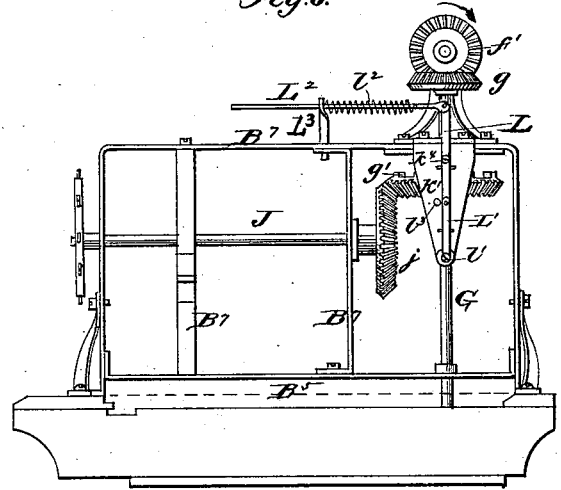

W. P. HALE.
GRAIN BINDER.
No. 251,221.
Patented Dec. 20, 1881.
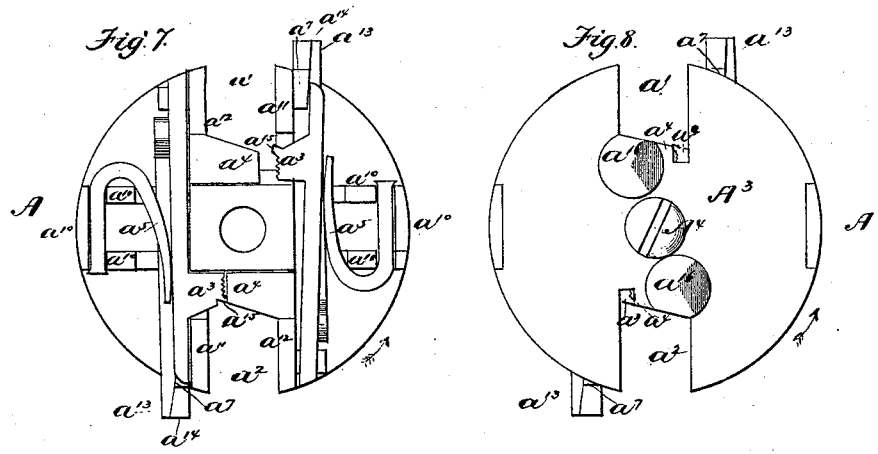
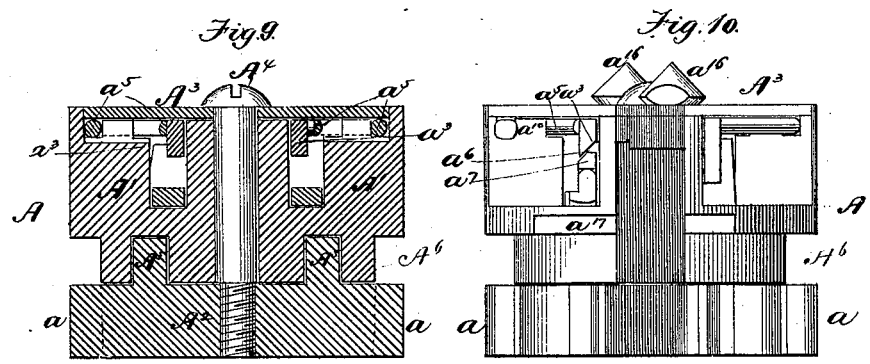
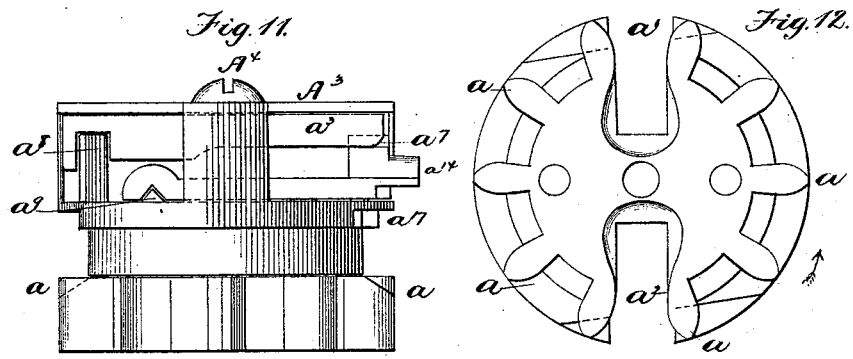
Witnesses.
W. H. H. Knight
W. Blackstock
Inventor.
Wm. P. Hale,
By L. Hill,
His Atty

W. P. HALE.
GRAIN BINDER.

No. 251,221.

9 Sheets—Sheet 6.

Patented Dec. 20, 1881.

Witnesses.
W. H. H. Knight.
W. Blackstock

Inventor.
Wm. P. Hale

W. P. HALE.
GRAIN BINDER.
No. 251,221. Patented Dec. 20, 1881.
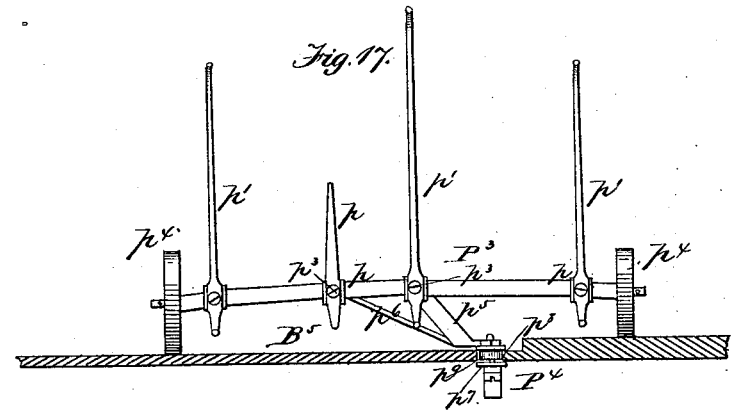
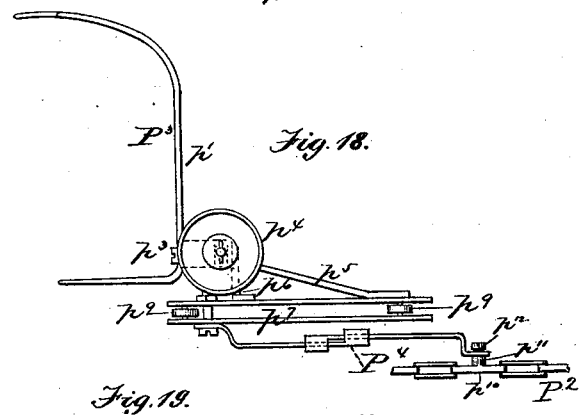
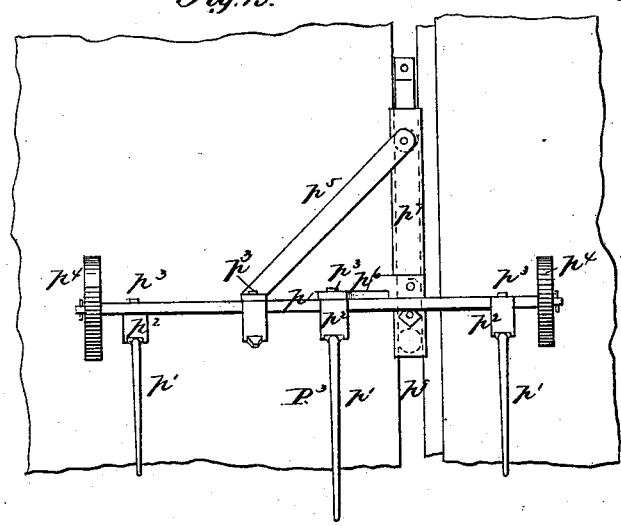

W. P. HALE.
GRAIN BINDER.

No. 251,221. Patented Dec. 20, 1881.

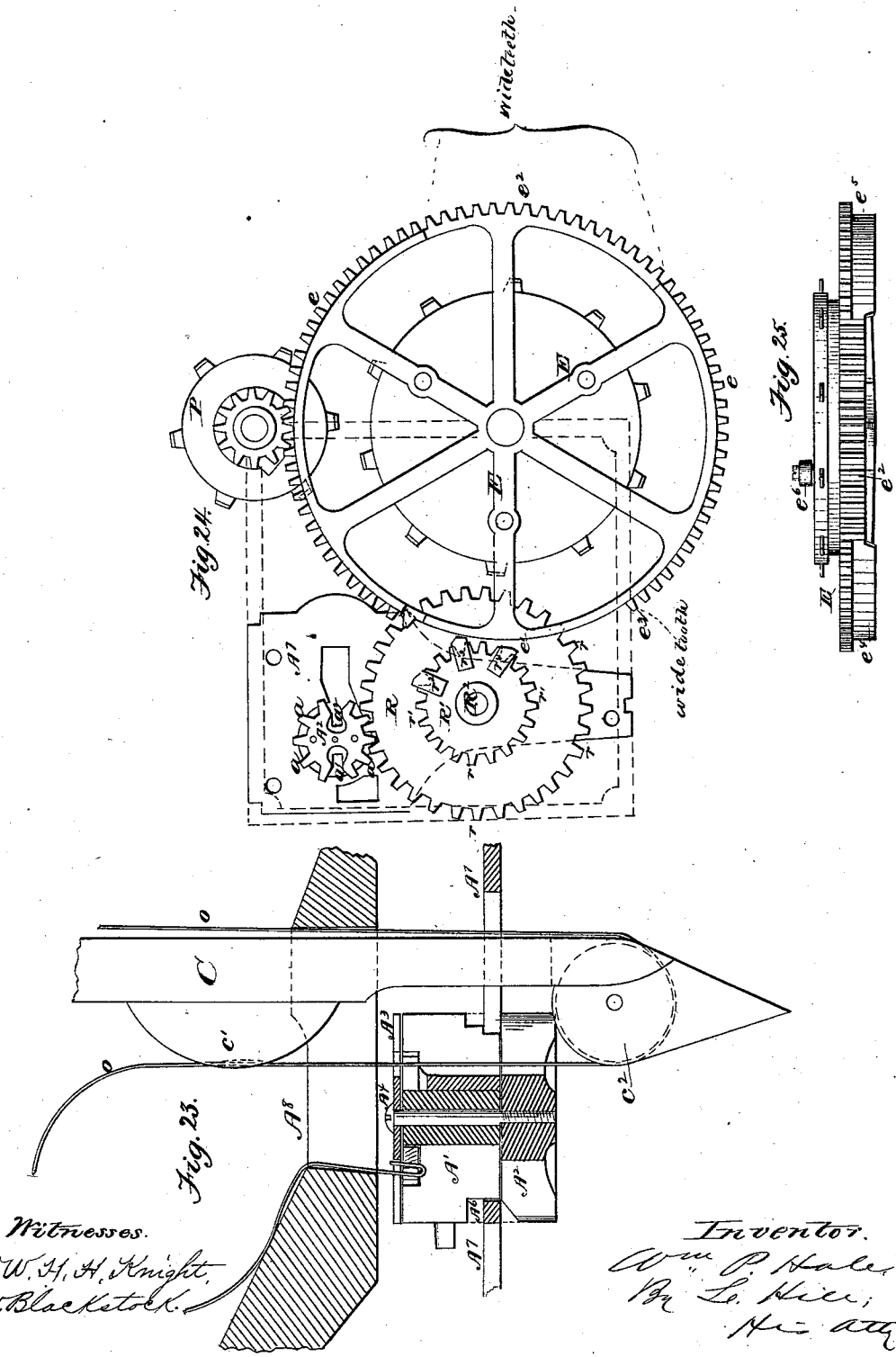

UNITED STATES PATENT OFFICE.

WILLIAM P. HALE, OF BROCKPORT, NEW YORK.

GRAIN-BINDER.

SPECIFICATION forming part of Letters Patent No. 251,221, dated December 20, 1881.

Application filed April 3, 1879.

To all whom it may concern:

Be it known that I, WILLIAM P. HALE, of Brockport, in the county of Monroe and State of New York, have invented a certain new and useful Binder Attachment for Harvesters; and I do hereby declare the following to be a full, clear, and exact description of the same, reference being had to the accompanying drawings, forming part of this specification, in which—

Figure 1:
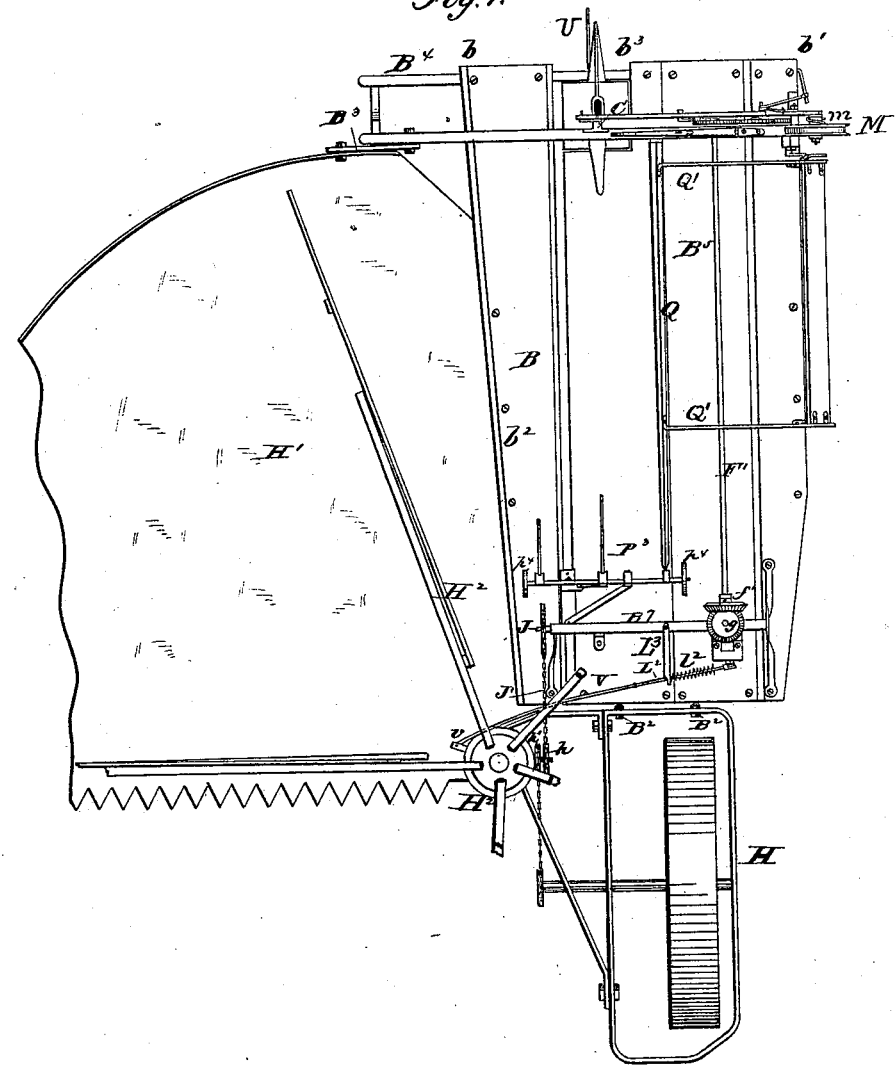
Figure 13:
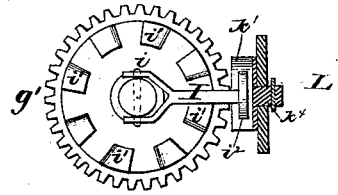
Figure 14:
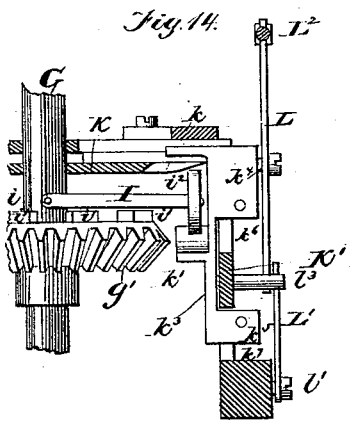
Figure 15:
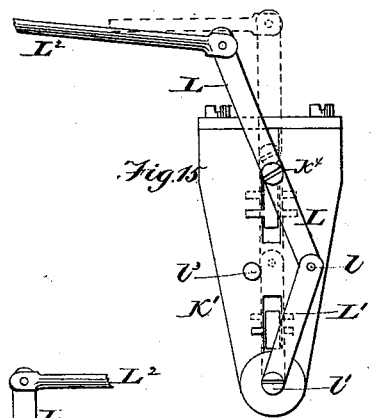
Figure 16:
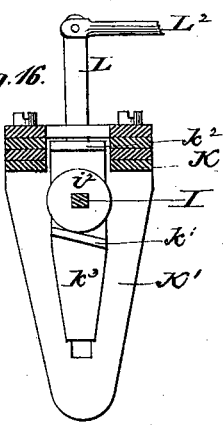
Figure 20:
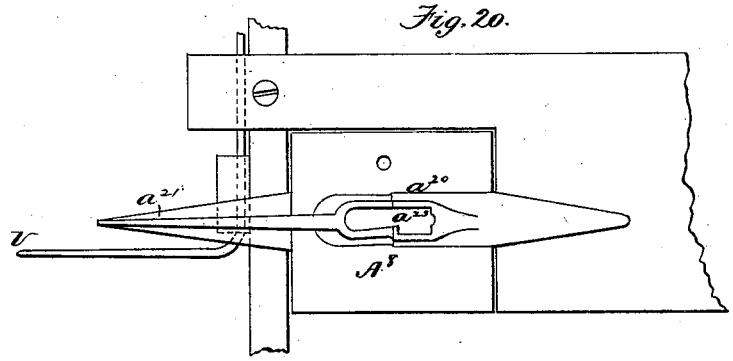
Figure 21:
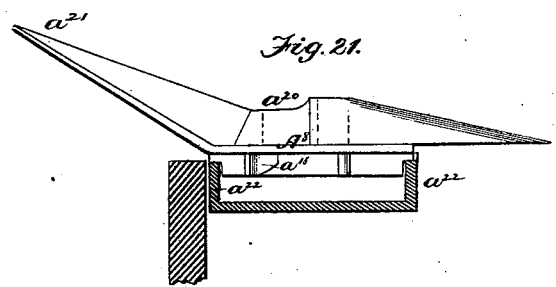
Figure 22:
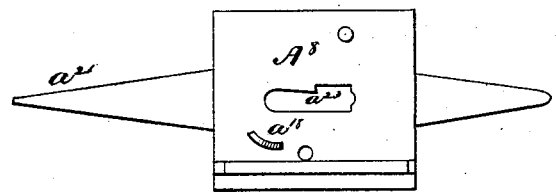

Figure 1 is a top plan view, showing the manner of connecting the binding truck or carriage to the frame of a harvester. Fig. 2 is a similar view, on an enlarged scale, of the binding-truck detached, a portion of the binding-platform being removed to show the arrangement of gearing, connecting-chains, &c. Fig. 3 is a side elevation of the binding-truck and the mechanism mounted thereon. Fig. 4 is a detailed view of the devices for throwing open the jaws of the binding-head. Fig. 5 is a view of the rear end of the binding-truck. Fig. 6 is a front end view of the same. Figs. 7 to 12, inclusive, are views showing the construction of the binding-head. Figs. 13 to 16, inclusive, are views showing the construction of the shipping mechanism by which the binding machinery is intermittingly connected to or disconnected from the driving mechanism of the harvester. Figs. 17, 18, and 19 are views of the binder rake. Figs. 20, 21, and 22 are views of the plate which is located over the binding-head. Fig. 23 is a detailed sectional view taken through the binding-head and plate $A^8$, and showing the lower end of the band-carrying arm. Fig. 24 is a bottom plan view of the gearing by which the binding-head is rotated and controlled, and Fig. 25 is a detached view of the large gear-wheel E.

Similar letters of reference denote the same parts in the several figures.

The object of this invention is to improve the mechanism employed in harvesting and binding grain; and the invention consists in the several novel devices and combinations of devices which I will now proceed to describe, and point out specifically in the claims.

In the drawings, H represents the harvesting-machine to which I have adapted my improvements, said machine, as here shown, being the machine known as the "Johnston harvester," built by The Johnston Harvester Company, of Brockport, New York. I do not, however, limit my invention to use in connection with said Johnston machine, but propose to adapt and apply it upon all harvesters to which it is applicable.

$H'$ represents the platform of the harvester, and $H^2$ represents the reel and rake, the latter being preferably of the form patented by O. Cooley, January 23, A. D. 1877, and now in use on said Johnston harvester, although any other rake mechanism may be substituted which will be capable of operative use in connection with my improvements without departing from the principle of my invention.

B represents the binding truck or carriage, mounted upon two or more swiveled wheels or casters, $B'$, or any equivalent runners, and attached to the main frame of the harvester by means of a suitable coupling or couplings, $B^2$, at the front end of the truck, and to the rear end of the harvesting-platform by another coupling, $B^3$, at or near the rear corner of the truck, as shown. The rear coupling, $B^3$, is made adjustable, so that the truck can be adjusted nearer to or farther from the harvester-platform, accordingly as the grain may be shorter or longer. The front end of the truck may also be laterally adjustable by any suitable means for the same purpose, if preferred.

The truck or carriage may be of any suitable form; but in practice I prefer to make it about seven feet and two inches in length from front to rear, about three feet in width at the front end, about three feet and eight inches in width from the point $b$ to the point $b'$ at the rear end, and about five feet in entire width at the rear end, including the extension $B^4$, to which the rear coupling is connected. The top $B^5$ of this truck constitutes the binding-platform, and in the full-size machine runs about fourteen inches from the ground, or about an average of three or four inches lower than the harvester-platform.

The truck or carriage is provided with an inclined bottom, $B^6$, between which and the top $B^5$ the sprocket-chains, gearing, binding-head, and various other parts of the machinery are arranged as shown in the drawings. A vertical frame, $B^7$, across the front end and another, $B^8$, across the rear end serve to support various mechanisms above the binding-platform, as hereinafter described. The grain is brought by the harvester-rake $H^2$ over the side $b^2$ of the binding-platform, so as to lie across the latter.

The secondary rake then sweeps it back to the rear end of the truck or carriage, where it is bound, and the completed gavel is discharged over the rear edge, $b^3$, of the binder.

A is the binding-head; C, the band-carrying arm or needle, sliding in a vertical guide, $c$, attached to the frame $B^8$.

D is a cam-lever pivoted to frame $B^8$ at $d$, and connected to the arm C by an oscillating pitman, $w$, for the purpose of operating the band-carrying arm.

F is a crank-arm fixed to a spur-wheel, $f$, on a shaft, F', for the purpose of actuating the cam-lever D, and thereby operating the band carrying arm.

G is a vertical shaft having its bearings in frame $B^7$, and serving to drive the shaft F' and its connected mechanism by means of bevel-gearing $g\,f'$, and all the other mechanism by means of a sprocket-wheel, G', and chain $G^2$. J is a counter-shaft driven by a sprocket-chain, J', from the harvester, and serving to drive the shaft G by means of a bevel-gear, $j$, fast on shaft J, and a similar gear, $g'$, loose on shaft G, but provided with a detent for holding it fast on its shaft when required. When the wheel $g'$ is running loose on its shaft the binding mechanism, all of which is set in motion by the vertical shaft G, will not operate, but will remain stationary, and when it is desirable that such mechanism shall operate, the wheel $g'$ must for the time be made fast to its said shaft. This is readily accomplished by the following means:

I is an arm articulated to the side of the shaft G by means of a joint or pivot—as, for example, the fixed pin $i$, extending through the shaft—which permits the outer end of the arm to swing freely up and down, but does not permit any lateral or horizontally-rotating movement of the arm independently of its shaft; and $i'\,i'$, &c., are teeth or lugs projecting upward from the upper surface of the loose wheel $g'$ in such manner that the arm I, when free, drops between said teeth, engaging with them, thereby receiving the motion of the wheel $g'$ and imparting it to the shaft G, or, in other words, rendering said wheel fast on said shaft. On the free end of the arm I is a loose revolving anti-friction disk or pulley, $i^2$, and above the wheel $g'$ is a fixed horizontal disk or plate, K, arranged in such position that when the arm I is dropped between and engaged with the teeth $i'$ the disk $i^2$ will immediately pass under the projecting disk or plate K, and be thereby locked or held down, so that the said arm cannot rise or become disengaged from said teeth until the disk again passes out from under the plate K. The plate K is cut away or mutilated at one point, $k$, so that when the wheel or loose disk $i^2$ comes under that point the arm I can be raised out of engagement with the cogs or teeth $i'$, and the wheel $g'$ be thus left loose again on its shaft.

Directly in front and below the opening $k$ I arrange an inclined track or plate, $k'$, under or in the path of disk $i^2$, so that when, by the revolution of the wheel $g'$ and its shaft G, the arm I comes around under the opening $k$ the disk $i^2$ will ride up on the incline $k'$, and thus disengage the arm I from the teeth $i'$, leaving the wheel $g'$ loose again on the shaft G. The arm I then stops and remains on the incline until the latter is lowered out of its way, and while the arm is thus held up all the binding mechanism remains inactive. To prevent the momentum of the arm from carrying it beyond the incline, I arrange a cover or plate, $k^2$, over the incline and so near to it that the disk on the arm cannot pass between them when the incline is in its normal elevated position. The incline is affixed to a plate, $k^3$, which slides up and down, guided by projections $k^4\,k^5$ extending into or through slots $k^6\,k^7$ in a dependent plate or lug, K', attached to K or its supporting-frame. On the front side of the plate K' the projection $k^4$ is made to serve as the movable fulcrum for a lever, L. The lower end of said lever is at $l$ articulated to a bar, L', which in turn, is pivoted at $l'$ to the lower end of plate K', and the upper end of the lever L is pivoted to the outer end of a draft-rod, $L^2$.

A spiral spring, $l^2$, is arranged around the draft-rod, between the lever L and the arm $L^3$, which guides and supports the draft-rod, and a stop, $l^3$, is so arranged at the lower edge of the lever L as that the latter will normally be held against it, and consequently in a vertical position, by the force of the spring $l^2$, in which position the joints or pivots $k^4\,l\,l'$ are all in line, and the incline $k'$ is therefore supported firmly and enabled to act with complete certainty in arresting the movement of the arm I and disengaging it from the wheel $g'$. By drawing the rod $L^2$ outward the lever L is thrown off of the center and its movable pivot $k^4$ is depressed, carrying the incline $k'$ down with it and dropping the arm I upon the wheel $g'$, which, being constantly in motion, immediately starts the shaft G and sets the binding machinery in operation. Once in operation, it cannot stop until the wheel $g'$ has performed one revolution and the arm I has arrived again on the incline $k'$, which again disengages it, and thereby automatically stops the binding machinery. The chain J', which drives the counter-shaft J and wheel $g'$, receives its motion, preferably, from a sprocket-wheel, $h$, cast on or attached to the side of the wheel $h'$, which drives the raking mechanism of the harvester proper.

In order to render the power of the shaft G available for operating the binding mechanism, it is transmitted by the wheel G' and chain $G^2$ through a sprocket-wheel, $G^3$, to a large horizontal gear-wheel, E, and is applied from that wheel. The wheel E drives the binder-rake by the following means:

P P' are two equal sprocket-wheels, supporting and driving a sprocket-chain, $P^2$. The wheel P has a gear-rim consisting of twelve teeth on its under side. The wheel E has a mutilated spur-gear consisting of seventy teeth, $e$, and a space, $e'$, representing fourteen teeth. One revolution of the wheel E therefore revolves the wheel P six times and allows it to stand still for a time equivalent to one of its own revolutions. The sprocket-chain P² is of such length that six revolutions of its driving-wheels P P′ make one revolution of the chain, and the binder-rake P³, being connected to the sprocket-chain by an oscillating pitman, P⁴, therefore makes one movement forward and back at each revolution of the wheel E, and at the end of its forward movement toward the binding-head rests for a time equal to one-seventh of the entire time taken up by its forward and back movement, during which rest it holds the grain in position to allow the binding-arm to carry the band down behind the gavel, after which the rake goes back to the front end of the binding table, and the incline $k'$ ungears the driving-shaft and stops its operation.

The rake P³ is constructed of a head, $p$, and several vertical teeth, $p'$, which may be bent back at their upper ends and also at their lower ends, if preferred. The lateral width of the teeth at their widest part is the same as the vertical width of the head or bar $p$. The teeth are secured to the head by square tubular blocks $p^2$, having a recess across one end to countersink the bar or head horizontally and a similar recess across the other end to countersink the teeth vertically. The teeth, the bar, and the recesses being all of the same width and thickness, either end of the blocks will fit to the head or to the teeth.

The teeth, blocks, and bar are secured firmly together by a bolt, $p^3$, passing longitudinally through the blocks and transversely through the teeth and bar, as shown. This makes a very stiff and strong connection without adding any unnecessary weight, and it renders the parts very convenient to put together and take apart.

The head is provided at its ends with two wheels, $p^4$ $p^4$, which travel upon the binder-platform, support the weight of the rake, and prevent vertical friction. It is also connected by braces $p^5$ $p^6$ to a flanged guide block, $p^7$, which travels in a slot, $p^8$, of the said platform, one flange of the block resting on the upper and one against the under edge of said slot. Between the two flanges are two horizontal friction pulleys or sleeves, $p^9$ $p^9$, which bear against the proximate edges of the slot and prevent lateral friction. The oscillating pitman P⁴ is at one end articulated to the under side of the block $p^7$, substantially beneath the head $p$, and at its other end is jointed to a pivot-pin on the upper side of the chain P². The construction of the said pin is shown in Fig. 18, where $p^{10}$ is the chain-link, $p^{11}$ the pin projecting up therefrom, and $p^{12}$ a headed screw, which holds the pitman securely on the pin.

The outer side of the sprocket-chain P² runs on a ledge, $p^{13}$, and against a guard-board, $p^{14}$, fixed to the frame of the machine, for the purpose of holding the pitman P⁴ properly to its work.

Q is a compressor, which, by the operation of mechanism that I will presently describe, is held up out of the way while the harvester-rake is sweeping the grain across the binding-platform B⁵. It is then allowed to drop upon the said grain and rest thereon while the grain is being moved back by the rake P³ to the binding mechanism, its office being both to compact and guide the grain. Its form is preferably that of a long bar somewhat inclined downward toward its rear end, to gather and compact the grain more effectually, and somewhat heavier at its rear than at its front end, to insure its effective operation. The bar thus preferably constructed is supported upon the free end of two curved arms, Q′, hinged to the table B⁵, or to standards projecting upward therefrom, as shown at Q². The rear arm, Q′, is provided with a projecting lateral arm, $q$, upon its rear side, which, at suitable intervals, is struck on the under side by a crank-pin, $q'$, and raised by the revolution of the crank, thereby elevating the compressor out of the way while the grain is being delivered onto the platform. When the grain has been fully delivered the crank-pin passes out from under the arm $q$ and the compressor drops by its own weight upon the grain. Springs $q^2$ may be employed to throw it quickly down upon the grain, and it may be weighted in any suitable manner to increase the effectiveness of its operation.

The crank-pin $q'$ is arranged on a short shaft, $q^3$, driven from the shaft F′ by means of equal spur-gearing $q^4$ $q^5$ $f$, whereby the revolutions of the crank $q'$, which lifts the compressor, are synchronous with those of the crank F, which lifts the needle or band carrying arm, but are so adjusted by the nearly-opposite positions of the two cranks while in the act of rotating as that the compressor shall rise when the band-carrying arm is descending or about to descend and shall fall when the said arm is rising or about to rise, thereby properly timing the movements of the compressor to those of the binder-rake and band-carrying arm.

In the form of machine here shown I have represented my improvements as applied to a wire-band machine in which the wire is twisted and cut off; but having adapted it also to cord-band machines, which will form the subjects of Letters Patent hereafter to be applied for, I do not limit the general principles of the invention to any particular class of machines, so far as the nature of the band and the means for grasping, turning, and severing it are concerned, which means I will now more particularly describe.

Referring to the binding or twister head A, the construction of which is clearly shown in Figs. 7 to 12, inclusive, the body thereof is composed of two metal blocks, A′ A², and a covering-plate, A³, all secured together by a strong screw-bolt, A⁴, and the parts A′ A² further locked or secured from turning independently by means of a spur or spurs, A⁵, extending from one part into the other. The head thus constructed has a cylindrical portion or ring, $A^6$, which forms the bearing-surface or enlarged vertical journal on which it revolves horizontally. Two opposite vertical grooves or recesses, $a'$ $a^2$, are provided in the sides of the head, as shown, said recesses extending through the length of the entire head, including the journals and covering-plate. The head is mounted in the supporting-plate $A^7$ by first inserting the journal $A^6$ down through a suitable hole or socket in the plate, bringing the part $A^2$ up under the plate, placing the cover $A^3$ upon the upper end, inserting the bolt $A^4$, and screwing all the parts firmly together.

In each recess $a'$ $a^2$ are two wire-griping jaws, $a^3$ $a^3$, one jaw of each pair being a movable spring-jaw, and the other being rigid and held firmly in position by driving it down into a dovetail space provided for it, as shown in Fig. 7. The movable jaw $a^3$ rests loosely in the head, and is pressed inward against the fixed jaw by a spring, $a^5$. Its lower inner corner, at or near the outer end, is beveled away, as shown at $a^6$, and a beveled wedge, $a^7$, is arranged beneath it, so that as the wedge is raised it will open the jaw and when it is depressed it will allow the spring to close the jaw. The rear end of the jaw's bar is hooked over a lug, as shown at $a^8$, to prevent any longitudinal movement, and the rear end of the wedge-bar is hooked over a similar lug, as shown at $a^9$, for the same purpose. The spring is supported and held in a lug or lugs, $a^{10}$, and the jaw-bars $a^3$ $a^4$ lie against flanges or lugs $a^{11}$ $a^{12}$, which hold them in place. The cover $A^3$ prevents the jaw from rising. The projection on the side of said bars, which forms the jaw proper, fits in a recess in the flange $a^{11}$ and prevents the jaws from moving downward. A projection, $a^{13}$, on the side of the wedge-bar, below the wedge itself, prevents the wedge from rising too far. The end of each wedge-bar projects from the side of the head, as shown at $a^{14}$, in order that at a suitable point in the revolution of the head said projecting end may strike against a cam to throw the wedge down and at another point be struck by a lever to throw the wedge up for the purpose of opening and closing the wire-griping jaws.

The form of the jaws proper is to be particularly noticed, they being beveled slightly backward to guide the wire properly to the point where it can enter between them, and the movable jaw having a projecting lip, $a^{15}$, which, after the wire has been introduced, locks behind it and absolutely prevents it from being withdrawn until the jaws open or the wire breaks. The jaws are made of steel or other hard tough metal, and are corrugated or roughened on their holding-surfaces. The wedge-bars are also preferably made of similar metal.

The cover $A^3$ is provided with two conical projections, $a^{16}$, to assist in guiding the band-wire properly to the jaws and prevent it from accidentally catching on the fixed jaw.

In order to provide a free escape for any short piece of wire that may by chance at any time be cut off, I cut away the side of the head, as shown at $a^{17}$, immediately beneath the outer ends of the flanges or lugs $a^{11}$ $a^{12}$, and I also bevel off one of the cogs $a$ on the lower part, $A^2$, of the head, which affords sufficient space both above and below the supporting-plate $A^7$ to allow said short pieces to escape without difficulty.

A flat metal plate, $A^8$, is arranged over the binding-head, supported upon three or more standards, $a^{22}$, projecting up from the plate $A^7$, and is provided with a dependent cam-lug, $a^{18}$, in such position that as the head rotates the projecting end $a^{14}$ of the wedge-bar will strike against the cam and be thrown down, thereby allowing the spring-jaw to close against the fixed jaw.

A curved lever, S, is pivoted to a flange, $A^{19}$, of the plate $A^7$, at the rear edge of the head, in such a position that its upper arm will project up vertically near the head, while its lower arm will come below the end $a^{14}$ of the wedge-bar as the latter is carried around the head, the lever being held in its normal position by a spring, $s$, and stop $s'$.

A long horizontally-operating lever, T, is pivoted upon the upper side of the plate $A^7$, at $t$, in such a position that its long arm will be struck by a pin, $e^6$, on the wheel E, and thereby oscillated on its pivot. The opposite arm, $t^2$, of lever T is bent around in such manner that when the lever is operated by the spur or lug $e^6$ its curved end will strike the upper arm of lever S and cause the lower arm thereof to rise against the end $a^{14}$ of the wedge-bar, raise the latter, and open the jaws in that side of the head, after which the recoil of the spring $s$ will reset the levers S and T. A knife or cutter, $t'$, projecting from lever T, as shown in Fig. 2, will, when said lever is operated by the spur $e^6$, as above described, be moved across the upper surface of the head at the inner end of the recess near the needle, and will cut off the wire band above the jaws of that recess. The head A is so arranged and adjusted that whenever it is at rest one of the recesses—say $a'$—will be in position for the passage of the needle or wire carrying arm down through it, and when in that position the jaws contained in such recess will be open to receive the band.

The machine is now ready to be operated, and for the purpose of priming or starting it the wire band is carried from the tension and take-up devices down the front side of the needle, put through the eye, drawn across over the twisting-head, and held in that position either by the hand of the attendant or by fastening its end to a pin at the rear edge of the carriage. Upon starting the machine the needle, if not already down, will descend, and the end of the wire extending across over the head will be caught in the recesses $a'$. The head will now begin to revolve, the wire will catch against that side of the recess nearest the movable jaw, and will be drawn in between the open jaws $a^3$ $a^4$. As the head continues to rotate the cam $a^{18}$ will release the movable spring-jaw, which will instantly close against the fixed jaw, gripe the wire, and hold it firmly in the head. The head will continue to rotate until it performs three full revolutions from the starting-point, when it will stop and the lever T will sever the wire above the covering-plate $A^3$ at the front recess, $a'$, and will at the same time open the jaws of the rear recess, $a^2$, thus severing a small piece of wire and discharging it from the machine. The end of the wire extending from the eye of the needle will remain griped between the jaws of recess $a'$, which are still closed. In this position of the working parts the machine will go out of operation by reason of the incline K ungearing the shaft G and wheel $g'$, as above described. The parts will continue to be thus held with the rake at the front end of the binding-table, and the grain-compressor elevated until the gate $v$ in the cam-track of the harvester-rake opens to let down a rake upon the harvester-platform, when the movement of said gate in opening will, by means of a connecting-rod, V, or other suitable device, draw upon the rod $L^2$, depress the incline $k'$, and bring the shaft G and wheel $g'$ into gear again, whereupon the needle will rise, the binder-rake will start, the compressor Q will drop, and the twister-head will perform half a revolution, thereby causing the recesses $a'$ $a^2$ to exchange places, the closed jaws of recess $a'$ carrying the end of the wire around to the rear side of the head, and the open jaws of recess $a^2$ presenting themselves in the path of the needle. The head will then cease rotating, and the binding mechanism will remain inactive, awaiting the gavel which the binder-rake is meanwhile bringing toward it. As the rake reaches the limit of its rearward movement the needle descends, carrying the wire down into recess $a^2$, the head starts and catches the wire, the jaws of recess $a^2$ close, the head performs three full revolutions, twisting the two wires around each other three times, the recess $a^2$ comes back to its position at the needle, the lever T cuts the wire above recess $a^2$ and opens the jaws in recess $a'$, and the bound bundle is ready to be discharged from the machine.

It will be observed that the body of the needle does not pass down through the recesses $a'$ $a^2$, but at a sufficient distance therefrom to allow the free movement of the projecting arm $a^{14}$, which otherwise would strike against the side of the needle.

The projection $c^2$ at the lower end of the needle, lying below the plane of the head when the latter is performing its threefold revolution and above it when performing its semi-revolution, does not interfere with the working of the head, but when the needle is down holds the wire so far into the recess as to insure its being caught and forced into the jaws.

Inasmuch as the band might not properly enter, or the resistance of the gavel might tend to force it out of the recess at the needle, the latter is provided with an upper projection or shoulder, $C'$, which projects the band into the recess, and, coming against the gavel when the needle is down, presses it back out of the way, leaving the band free to enter and remain in the recess.

The plate $A^8$ performs the function of supporting the cam $a^{18}$, as above described, and also covers the head A, knife, and levers T S, so as to protect them from the straw. On its upper side is arranged a vertical flange, $a^{20}$, surrounding the opening $a^{23}$, through which the needle passes, the function of which flange is to hold the bundle far enough above the twister-head to give a sufficient length of wire between the bundle and head to form three (more or less) twists without danger of breaking.

The flange is inclined gradually downward to the level of the table on the side toward the rake, to prevent it from interfering with the free movement of the grain, and on the opposite side it terminates in an upwardly-inclined arm, $a^{21}$, which facilitates the proper holding of the bundle during the binding operation.

The opening or slot $a^{23}$ is made larger at its front than at its rear end, so that its front end fits to the body of the needle and operates as a guide to hold the latter in position and prevent it from springing forward, while its rear end accommodates the projection $c^2$ near the eye of the needle. All the parts are thus firmly supported and held in place during the binding operation.

A gavel-compressor, U, is arranged at the rear edge of the carriage, to assist in holding and compacting the bundle during the binding thereof, said compressor being constructed in the form of an arm or arms projecting up from a horizontal rock-shaft, $u$, operated by a rod, $u'$, which extends to the needle-lever D, as shown, whereby the descent of the needle-lever raises the arm U and compresses the grain around which the band is being carried by the needle.

The movements of the binding or twister head are effected by power derived from the large wheel E and communicated by an intermediate vertical shaft, $R^2$, and two spur-wheels, R R', thereon, in the following manner:

The lower part, $A^2$, of the head is constructed with, say, ten strong spur-cogs, $a$, at equal distances apart, the recesses $a'$ $a^2$ coming between two cogs on each side without interfering with their regular spacing, and dividing the cog-rim into two series of five on each side of the wheel. The cog-rim $a$ gears into the spur-wheel R, containing, say, thirty-five cogs, $r$, which, being to the cogs $a$ in the ratio of $3\frac{1}{2}$ to 1, will turn the head three and one-half times to every revolution of the shaft $R^2$.

Beneath the wheel R, and fixed to the same shaft, is the wheel R', containing, say, twenty-one cogs, $r'$, and three stop-lugs, $r^2$ $r^3$ $r^4$. This wheel R' is driven by the wheel E by means of a mutilated gear-rim, $e^2$ $e^3$, arranged on the periphery of wheel E below the gear-rim $e$. The lower gear-rim, $e^2$ $e^3$, is composed of, say, sixteen of the teeth $e$, widened into the form $e^2$, as shown in Fig. 25, and two unequal vacant spaces, $e^4$ $e^5$, separated by a single wide cog, $e^3$, almost diametrically opposite to one end of the toothed segment $c^2$. The result of this combination is that as the wheel E makes a single revolution the wide tooth $e^3$ engages with the spur-wheel R', turning it one-seventh of a revolution, whereupon the stop-lugs $r^2 r^3$, acting against the vacant or smooth space $e^5$, hold the wheel R' in position until said vacant space passes. The turning of the wheel R' one-seventh around—equal to the distance of five teeth on wheel R—rotates the head A a distance of five teeth, or, in other words, half around. Then when the vacant space $e^5$ has passed the cog-rim $e^2$ engages with the wheel R' and turns it six-sevenths of a revolution, thereby rotating the wheel R a distance equal to thirty teeth, and consequently giving the binding-head three full revolutions. The stop-lugs $r^3$ $r^4$ then act against the smooth rim $e^4$, holding the wheels R' R and head A from further revolving until the wide spur $e^3$ again comes around and half rotates the binding-head, as before.

The teeth of the several wheels may be apportioned in any other way which will enable the head to perform two, three, four, or any other preferred number of revolutions at the proper time and in the proper manner to accomplish the results desired.

Recurring now to the operation of the needle, I will describe more particularly the manner in which its movements above referred to are obtained and are timed so as to co-operate accurately with the binding-head, the rake, and the compressors.

It will at once be seen that the movements of the wheel E and the lifting-crank F, being derived by positive connections from the shaft G, will always be synchronous. It will also be observed that when the needle is ready to descend the gavel is in place to be bound, the work of the compressor Q is done, and the work of the compressor U is about to begin. So far as the two compressors are concerned, therefore, it is only necessary to arrange the lifting-cranks of the needle and the compressor Q to lift alternately and to arrange the actuating-rod $u'$ and the lifting-crank of the needle to lift simultaneously to accomplish the requisite co-operation of said parts; but in order to time the needle accurately to the movements of the twisting-head and rake it is actuated by a cam-lever, D, of peculiar construction, containing a large opening or slot, D', a portion of the periphery of which is shaped into different cam-surfaces to control the movements of the needle accurately. The lifting and depressing crank F projects into the slot D', and when the shaft G and wheel $g'$ ungear is always at or closely approaching the point $d'$ of the cam-surface. Then when said shaft and wheel are thrown into gear again by the operation of the gate of the harvester-rake the crank F continues to rise, striking the lever D at $d'$, raising the lever as it slides along the cam-surface from $d'$ to $d^2$, and thereby raising the needle. Meanwhile, during the raising of the needle, the compressor Q is allowed to fall, the binder-rake is started toward the needle, the compressor U is depressed out of the way, and the twisting-head A is turned half round to bring its open jaws toward the needle, as above described. Then the crank F, continuing to rotate, enters upon a curved surface, $d^2$ $d^3$, whose curvature is concentric with the axis of the crank, and therefore while passing from $d^2$ to $d^3$ it simply holds the needle elevated and stationary, the rake meanwhile advancing and the twister-head remaining immovable. Then the crank enters upon a narrow cam-recess, $d^3$ $d^4$, and while passing around this recess it depresses the needle and operates the compressor U, the rake, twister-head, and compressor Q meanwhile remaining stationary. The crank then enters upon a curved surface, $d^4$ $d^5$, whose curvature is concentric with its axis, as above described, and, passing off of said surface, crosses the open space D', the needle all the while remaining depressed and stationary and the compressor U remaining elevated and stationary, but the rake moving back to the front end of the platform, the compressor Q rising, and the twister-head and wire-cutter operating. The wheel $g'$ and shaft G then go out of gear, leaving the needle down, the compressor U up, the compressor Q up, the rake at the front end of the machine, and the bound bundle ready to be ejected by the next succeeding movements of the machinery.

It remains now only to describe the devices for holding and supplying the band, taking up its slack, and giving it the proper tension to draw it tightly around the bundle.

The wire or other material of the band (shown at $o$) is supplied from a reel, M, mounted loosely on a short shaft, M', supported in standards $M^2$ $M^3$. A coiled spring, $m$, is arranged around the shaft, with one end secured to the shaft and the other end secured to the reel, so that while a sufficient draft upon the wire at $o$ will rotate the reel to a limited extent on the shaft, compressing the spring around it if the shaft be held fixed, the recoil of the spring will, when said draft ceases, rotate the reel backward and take up the wire thus drawn from it. The wire, proceeding from the reel, passes through guides $n$ $n'$ on a slack take-up spring-bar, N, and thence goes down through a hole in the frame $B^8$ to the eye of the needle. One of the standards, $M^2$, which support the reel-shaft is a spring, which normally stands slightly away from the shoulder at the inner end of the shaft-journal, and thereby allows the shaft to rotate freely, but which can be compressed against said shoulder so as to clamp the shaft and by friction hold it stationary. Outside of this spring-standard, and pivoted to the frame $B^8$, is a wedge-shaped cam-lever, $m'$, whose long arm $m^2$, at right angles to the short arm, is connected to the side of the lever D by means of a connecting-rod, $m^3$. When the needle is not at or near the lower end of its movement the cam-wedge $m'$ is held back away from the spring-standard; but when the needle approaches the lower end of its movement the wedge $m'$ is forced against the side of the standard, springing it in against the shoulder on the shaft and causing it to operate as a friction brake to hold the shaft from turning in its bearings. So much wire as the needle then continues to draw from the reel is obtained by revolving the reel on the shaft against the resistance of the spring $m$, which resistance causes a strong tightening of the band around the bundle. When the needle rises the pressure is removed from the spring-standard and the tension is reduced to a minimum. The machine therefore affords a variable tension, which is so adjusted as to feed the wire freely to the needle for the purpose of applying it around the bundle, and then, when the wire is about to be closed together and twisted, holding it back strongly, so as to tighten the band at that time and not previously. The spring arm N merely takes up the slack caused by the descent of the needle-eye below the twisting-head.

I have described the rod $L^2$ as operated by the cam-gate of the harvester-rake; but it is evident that it may be operated by the movement of the rake-arm which is raking off, or by any other part of the harvester-rake machinery whose movement corresponds in time to that of the gate or raking-off arm.

I claim as my invention—

1. The combination of the driving mechanism of a harvester, the binding mechanism of a binder, a harvester rake having rake-arms, and mechanism whereby any one of said arms is caused to sweep the platform at will, so as to carry the grain to the binding mechanism, and a shipping device operated by the mechanism of the harvester-rake, whereby the bringing of any rake-arm into operation to rake off will ship the said device and cause the binding mechanism to operate, substantially as described.

2. The combination of the driving mechanism of a harvester, the binding mechanism of a binder, a harvester-rake having rake-arms, and mechanism by which any one of said arms is caused to sweep the platform at will, so as to carry the grain to the binding mechanism, and a shipping device adapted to be shipped by the aforesaid rake-controlling mechanism, so as to cause the binding mechanism to operate, and means for automatically unshipping said device at the completion of the binding operation, substantially as described.

3. The combination of a harvester having a revolving rake consisting of a cam-track, revolving pivoted arms, and a switch or gate, an independent binding attachment having a driving-shaft continuously rotated by power derived from the main wheel of the harvester, a shipping device operated by the gate of the harvester-rake and adapted to connect the said continuously-rotating driving-shaft with the mechanism of the binder which gathers the bundle and applies the band, whereby the opening of said gate will set in motion the said gathering and band-applying mechanisms of the binder, substantially as described.

4. The combination of the harvester, its rake, the continuously-rotating driving-shaft of the binder, the bundle gathering and band-applying mechanism, the shipping device operated by the cam-gate of the rake and adapted to connect the continuously-rotating driving-shaft to such mechanism, and means for automatically unshipping the said shipping device to again disconnect said parts, substantially as described.

5. The combination of a shaft, G, with a shaft, F', for driving the needle, a sprocket-chain, $G^2$, or its equivalent, for driving the binding-head and cutter, a continuously-rotating counter shaft, J, operated by power derived from the harvester, and a shipping device operated by the cam-gate of the harvester-rake for connecting and disconnecting the shafts G J, substantially as described.

6. The combination of the shafts J G, the movable incline $k'$, the pivoted arm I, the wheel $g'$, the disk K, the lever and bar L L', the spring $l^2$, and stop $l^3$, substantially as described.

7. The combination of the binder-rake $P^3$ and its teeth $p'$ with the square tubular blocks $p^2$, having the countersunk recesses in their ends, and the bolts $p^3$, by which the head, blocks, and teeth are fastened together, substantially as described.

8. The combination of a binder-rake, $P^3$, and a guide-slot, $p^8$, on the platform with the guide-block $p^7$, having pulleys $p^9$ to prevent lateral friction and $p^4$ to prevent vertical friction, substantially as described.

9. In a harvester-binder, the combination of the needle with a band-reel mounted loosely on a shaft and secured thereto by a coiled spring, $m$, and a friction-brake operated by the needle-driving mechanism to clamp and arrest the movement of said shaft and permit the reel to revolve thereon against the compression of the spring, substantially as described.

10. The combination of the spring take-up arm N with the needle-driving mechanism, the reel M, the spring $m$, and the friction-brake, whereby the movement of the reel-shaft is arrested as the needle approaches the lower end of its movement, substantially as described.

11. In a grain-binder, the twisting-head having the griping-jaws in its upper end, the driving-gear rim at its lower end, and an enlarged journal, $A^6$, between the driving-gear rim and the upper end of the head, the head, journal, and driving-gear all being provided with lateral recesses $a'$ $a^2$, substantially as described.

12. In a harvester-binder, a rotating twister-head having a fixed jaw or jaws and a movable jaw or jaws which are closed by spring-power and opened by a wedge bar or bars arranged in and moving with the head, substantially as described.

13. In a harvester-binder, the combination of a rotating twister-head with jaws closing by spring-power and opening by a wedge or cam supported on the head, said wedge or cam being so constructed as to hold the jaws open until it is retracted by striking a cam or its equivalent during the rotation of the head, substantially as described.

14. In a harvester-binder, the combination of the rotating head, the band-clamping jaws, closed by spring-power and opened by a cam or wedge, the cam $a^{18}$ for closing the jaws, and the lever S for opening them, substantially as described.

15. The binding-head A, having the cogged rim $a$, bearing-rim $A^6$, cover $A^3$, clamping-jaws, springs, and wedge-bar, projecting as shown at $a^{14}$, all constructed and combined substantially as described.

16. The combination of the binding-head A, having a lateral recess or recesses for receiving and jaws for grasping and holding the band, with the beveled or tapering projection or projections $a^{16}$, for guiding the band properly to the jaws, substantially as described.

17. The combination of a rotating twister-head, having band-clamping jaws arranged and operating on its opposite sides, with a cutter for severing the band above the jaws next to the needle and a device for opening the jaws at the opposite side of the head simultaneously with the severing of said band, substantially as described.

18. The lever T, having the knife $t'$ and arm $t^2$, in combination with the lever S and the binding-head A, constructed and operating substantially as described.

19. The wheel E, constructed with the mutilated gear-rim $e$, adapted to operate the binder-rake, and the mutilated gear-rim $e^2$ $e^3$, adapted to operate the binding-head, said gear-rims being arranged upon the wheels, substantially as described.

20. The wheel R', having teeth $r'$ and three stop-lugs, $r^2$ $r^3$ $r^4$, adapted to operate in connection with the wheel E, in the manner herein shown and described.

21. The combination of the wheels P P', that drive the binder-rake, with the head A, wheels R R' E, shafts G F', needle C, and lever D, substantially as described.

22. The combination of the wheels P P', that drive the binder-rake, with the head A, wheels R R' E, shafts G F', needle C, lever D, and compressor Q, substantially as described.

23. The combination of the wheels P P', that drive the binder-rake, with the head A, wheels R R' E, shafts G F', needle C, lever D, and compressor U, substantially as described.

WILLIAM P. HALE.

Witnesses:
W. BLACKSTOCK,
M. CHURCH.